United States Patent [19]
Kleewein et al.

[11] Patent Number: 6,009,428
[45] Date of Patent: Dec. 28, 1999

[54] SYSTEM AND METHOD FOR PROVIDING A SINGLE APPLICATION PROGRAM INTERFACE FOR HETEROGENEOUS DATABASES

[75] Inventors: James Charles Kleewein; Eileen Tien Lin; Tina Louise Mukai, all of San Jose; Yun Wang, Saratoga, all of Calif.

[73] Assignee: International Business Machines Corporation, Armonk, N.Y.

[21] Appl. No.: 08/931,008

[22] Filed: Sep. 15, 1997

[51] Int. Cl.⁶ .................................................... G06F 17/30
[52] U.S. Cl. .................. 707/10; 707/2; 707/100
[58] Field of Search ............................ 707/10, 100, 101, 707/2

[56] References Cited

U.S. PATENT DOCUMENTS

| | | | |
|---|---|---|---|
| 5,278,978 | 1/1994 | Demers et al. | 707/101 |
| 5,408,652 | 4/1995 | Hayashi et al. | 707/1 |
| 5,416,917 | 5/1995 | Adair et al. | 395/500 |
| 5,560,005 | 9/1996 | Hoover et al. | 395/600 |
| 5,596,744 | 1/1997 | Dao et al. | 707/10 |
| 5,596,746 | 1/1997 | Shen et al. | 707/101 |
| 5,634,053 | 5/1997 | Noble et al. | 395/604 |
| 5,724,575 | 3/1998 | Hoover et al. | 395/610 |
| 5,806,066 | 9/1998 | Golshani et al. | 707/100 |

*Primary Examiner*—Wayne Amsbury
*Assistant Examiner*—Cheryl Lewis
*Attorney, Agent, or Firm*—Ohlandt, Greeley, Ruggiero & Perle

[57] ABSTRACT

An application program interface at a local processor enables transparent access to both a local database and a remote database. The remote database includes (i) a remote DBMS which segregates data into distinct remote datatype categories and (ii) remote data functions which define functions that are executable by the remote DBMS with respect to categories of remote datatypes. The local processor includes a memory which stores (i) a local DBMS that includes local datatypes which segregate locally stored data into local datatypes; (ii) local functions which define actions that are executable by the local DBMS with respect to defined categories of the local datatypes, and (iii) tables which store a mapping between local datatypes and remote datatypes, and local functions and remote functions. The mapping between at least one local datatype and at least one remote datatype indicates that the remote datatype is to be transformed into a local defined datatype that is different than the remote datatype. A local processor employs the table to convert a received instance of the at least one remote datatype to a mapped local datatype and subjects data comprising the instance of the remote datatype to a local function which is not executable for the remote datatype. The application program interface further enables specification of a function to be carried out at the remote database with respect to data stored thereat, which function is not readily performable by the local processor.

24 Claims, 3 Drawing Sheets

TYPE MAP
FIG.2

| | SOURCE NAME | SOURCE TYPE | SOURCE VERSION | SOURCE PROTOCOL | LOCAL SCHEMA | LOCAL TYPE | LOCAL PRECISION | LOCAL SCALE | REMOTE SCHEMA | REMOTE TYPE | REMOTE UPPER PRECISION | REMOTE LOWER PRECISION | REMOTE UPPER SCALE | REMOTE LOWER SCALE | REMOTE S_OPR_P | ... |
|---|---|---|---|---|---|---|---|---|---|---|---|---|---|---|---|---|
| ROW 1 | N | SYBASE | N | N | SYS IBM | TIME STAMP | N | N | dbo | SMALL DATE TIME | N | N | N | N | N | |
| ROW 2 | SERVER 1 | SYBASE | N | N | SYS IBM | DATE | N | N | dbo | SMALL DATE TIME | N | N | N | N | N | |
| ROW 3 | N | ORACLE | N | N | SYS IBM | SMALL INT | N | N | N | No. | 4 | 1 | 0 | 0 | N | |
| ROW 4 | N | ORACLE | N | N | SYS IBM | INT | N | N | N | No. | 5 | 6 | 0 | 0 | N | |
| ROW 5 | N | ORACLE | N | N | SYS IBM | DEC. | N | N | N | No. | 31 | 1 | 31 | 1 | >= | |
| | a | b | c | d | e | f | g | h | i | j | k | l | m | n | o | |
| | SOURCE | | | | LOCAL | | | | REMOTE | | | | | | | |

40

FUNCTION MAP
FIG.3

| | SOURCE NAME | SOURCE TYPE | SOURCE VERSION | SOURCE PROTOCOL | LOCAL FUNCTION | REMOTE FUNCTION |
|---|---|---|---|---|---|---|
| ROW 1 | N | ORACLE | N | N | 104 | TO_NUMBER (TO_CHAR(:1P,'DD')) |
| ROW 2 | N | ORACLE | N | N | 926 | TRANSLATE (:1P,:3P,:2P) |
| | a | b | c | d | e | f |

SYSTEM AND METHOD FOR PROVIDING A SINGLE APPLICATION PROGRAM INTERFACE FOR HETEROGENEOUS DATABASES

CROSS-REFERENCE TO RELATED PATENT APPLICATIONS

This Application is related to the following co-pending patent applications:

"HETEROGENEOUS DATABASE SYSTEM WITH DATA SOURCE EXTENSIBILITY", Inventor(s): Kleewein et al., U.S. Ser. No. 08/929,809, pending;

"METHOD AN APPARATUS FOR OPTIMIZING QUERIES ACROSS HETEROGENEOUS DATA BASES", Inventor(s): Kleewein et al., U.S. Ser. No. 08/929,877, allowed;

"METHOD AND APPARATUS FOR OPTIMIZING A MERGE-JOIN OPERATION ACROSS HETEROGENEOUS DATABASES", Inventor(s): Kleewein et al., U.S. Ser. No. 08/931,404, allowed;

"METHOD AND APPARATUS FOR CACHING RESULT SETS FROM QUERIES TO A REMOTE DATABASE IN A HETEROGENEOUS DATABASE SYSTEM", Inventor(s): Kleewein et al., U.S. Ser. No. 08/931,003, allowed;

"METHOD AND APPARATUS FOR DEFERRING LARGE OBJECT RETRIEVALS FROM A REMOTE DATABASE IN A HETEROGENEOUS DATABASE SYSTEM", Inventor(s): Kleewein et al., U.S. Ser. No. 08/929,642, pending;

"HETEROGENEOUS DATABASE SYSTEM WITH DYNAMIC COMMIT PROCEDURE CONTROL", Inventor(s): Kleewein et al., U.S. Ser. No. 08/931,029, pending; and "METHOD AND APPARATUS FOR ACCESSING OF LARGE OBJECT DATA SEGMENTS FROM A REMOTE DATABASE", Inventor(s): Maheshwari et al., U.S. Ser. No. 08/931,002, pending.

FIELD OF THE INVENTION

This invention relates to an interface which enables transparent access to heterogeneous databases and, more particularly, to an application program interface which provides requested data without the user being aware of the database source of the data.

BACKGROUND OF THE INVENTION

Many organizations have plural sites where databases are maintained, each with different operating systems and database structures. There is a continuing demand to join together such multiple databases so as to enable transparent access to data contained in them. "Transparent" implies that the user at a specific site is able to access data from all connected databases, without being aware of the origin of the data nor of any incompatibilities which might exist between a local database and any of the plurality of remote databases. Hereafter, it is also to be understood that the terms "remote" and "local" not only refer to physical locations but also to databases that are located at a single site (on one or more computers), but are controlled by different operating systems or database protocols. In the latter category, "local" defines the site where the data query is initiated and "remote" defines the database which is controlled by a database management system (DBMS) that is different from a DBMS at the local site.

For instance, one site might utilize DB2 (a trademark of the International Business Machines Corporation) as its resident DBMS; another might use Oracle (a trademark of the Oracle Corporation) as its DBMS; and still another, Sybase (a trademark of the Sybase Corporation) as its resident DBMS. Transparent access enables a user at one site (e.g. the DB2 site) to utilize only one application program interface to access all of the aforesaid databases, without worrying about DBMS incompatibilities.

One of the more widely used database types is the "relational" database wherein various datatypes are related in accordance with predetermined relationships. More recently, object-based databases have come into use and provide not only defined datatypes, but further enable a mapping of functions to specific datatypes. To enable such disparate databases to be configured into a transparent access system, the prior art has utilized one-for-one translation tables. Such a table enables (i) a user to access a datatype from a remote database; and (ii) to receive the datatype and automatically, under control of a conversion table, convert that datatype to a local database datatype so that it can be handled in accordance with the local datatype protocols.

So long as the data contents of the respective datatypes are susceptible to being handled similarly, such conversion procedures are satisfactory. However, if the data contained in a datatype from a remote database includes a different attribute than the data in a datatype at the local database, errors can occur when using a one-for-one translation table. For instance, if the datatypes are both product prices, but one datatype is expressed in a first currency denomination and the other datatype is expressed in a second currency denomination, errors will occur in the processing of the converted datatype at the local database.

U.S. Pat. No. 5,278,978 to Demers et al. (assigned to the same Assignee as this application) describes a method for establishing a context in which data exchange between dissimilar relational DBMS's can be mutually understood and preserved. When such databases must talk to each other, each DBMS identifies its machine and system descriptors to the other. This establishes a data context and is done only once during a communications session. When data is then sent to a receiving DBMS, specific descriptions of the data precede the data itself and refer to the machine and system descriptors earlier identified. The received data is then subjected to a conversion process to interpret the data by referencing the machine and system descriptors.

U.S. Pat. No. 5,416,917 to Adair et al., assigned to the same Assignee as this Application, enables a database to request or receive data that is expressed in a non-native form. The Adair et al. system establishes layers of descriptive information which isolate machine characteristics, levels of support software and user data description. Any data conversions that are necessary are accomplished only by the receiver of the data and then only at the point where it is necessary to have the data represented in the receiver's native format for processing.

U.S. Pat. No. 5,560,005 to Hoover et al. describes an object-based, relational, distributed database system, wherein each of a plurality of remotely located user computers include a heterogeneous data structure. Data at such locations are "homogenized" by mapping predetermined data field items stored in the heterogeneous computers to corresponding object attributes associated with a predetermined instance of an object. The system stores location information and status information relating to the homogenized data in a centralized "object broker" processor for object management. This facilitates location and retrieval of data items from the remote heterogeneous databases.

Dao et al. in U.S. Pat. No. 5,596,744 describe a heterogeneous database management system which provides a unified view to a user of all attached databases. Dao et al. employ a "dictionary node" which represents schema, data distribution, local site configuration and inter-site relationships of data among various nodes and their associated databases. A data information manager, uses the data dictionary, in combination with a data query from a user, to decompose the data query into a local-site execution plan for retrieval of remote data. Thereafter, the local-site execution plan is transmitted to a remote site for execution.

Hayashi et al. in U.S. Pat. No. 5,408,652 describe a heterogeneous database system for providing a unified response to a user's inquiry. Hayashi et al. employ a dictionary for storage of basic data organization information relating to each disparate database, names of datatypes, etc., etc. Through use of the dictionary, data translations are carried out which enable the creation of different access procedures for different database data structures.

U.S. Pat. No. 5,596,746 to Shen et al. describes a method for transforming relational database schema into object models, using conversion tables. Associations between classes of objects are performed on a one-to-one, one-to-many and many-to-many association basis by analyzing various attributes. Briefly stated, the method maps the database schema into instances in a table metamodel. Next, the information in the table metamodel is mapped into instances in an object metamodel and thereafter, the information and the object metamodel are used to generate a file that is compatible with an object modeling tool to enable display of an object model on a display device.

The above indicated prior art either does not address datatype and/or function mapping or utilizes straightforward mapping of one datatype into another datatype to enable transparent access in heterogeneous database systems. To provide additional flexibility for the user of a heterogeneous database system, the system needs to be able to convert data classified in a remote datatype into a different datatype at the local database so that the received data can be subjected to one or more functions that are applicable to the local datatype. Further, a local DBMS needs to be able to utilize a remotely available function in accordance with data available at a remote database, when the particular function is not available at the local database. Also, there is a need in a local relational database to be able to (i) convert a received datatype to one or more datatypes, dependent upon a characteristic of the received data, or (ii) to a new datatype which can be subjected to one or more local functions which may not be available at the remote database.

Accordingly, it is an object of this invention to provide an improved DBMS, wherein a user is provided with a unified view of a heterogeneous database system.

It is another object of this invention to provide an improved DBMS wherein a datatype conversion can be accomplished which enables specific local functions to be applied to a local datatype, which function may or may not be available at a remote database.

It is yet another object of this invention to provide an improved DBMS wherein a function available at a remote database system can be utilized to operate upon remotely positioned data.

SUMMARY OF THE INVENTION

An application program interface at a local processor enables transparent access to both a local database and a remote database. The remote database includes (i) a remote DBMS which segregates data into distinct remote datatype categories and (ii) remote data functions which define functions that are executable by the remote DBMS with respect to categories of remote datatypes. The local processor includes a memory which stores (i) a local DBMS that includes local datatypes which segregate locally stored data into local datatypes; (ii) local functions which define actions that are executable by the local DBMS with respect to defined categories of the local datatypes, and (iii) tables which store a mapping between local datatypes and remote datatypes, and local functions and remote functions. The mapping between at least one local datatype and at least one remote datatype indicates that the remote datatype is to be transformed into a local defined datatype that is different than the remote datatype. A local processor employs the table to convert a received instance of the at least one remote datatype to a mapped local datatype and subjects data comprising the instance of the remote datatype to a local function which is not executable for the remote datatype. The application program interface further enables specification of a function to be carried out at the remote database with respect to data stored thereat, which function is not readily performable by the local processor.

BRIEF DESCRIPTION OF THE DRAWINGS

FIG. 2 is a schematic diagram of a type map that enables a mapping of remote datatypes to local datatypes.

FIG. 3 is a function map that enables a mapping of local functions to remote functions.

DETAILED DESCRIPTION OF THE INVENTION

Figure 1:
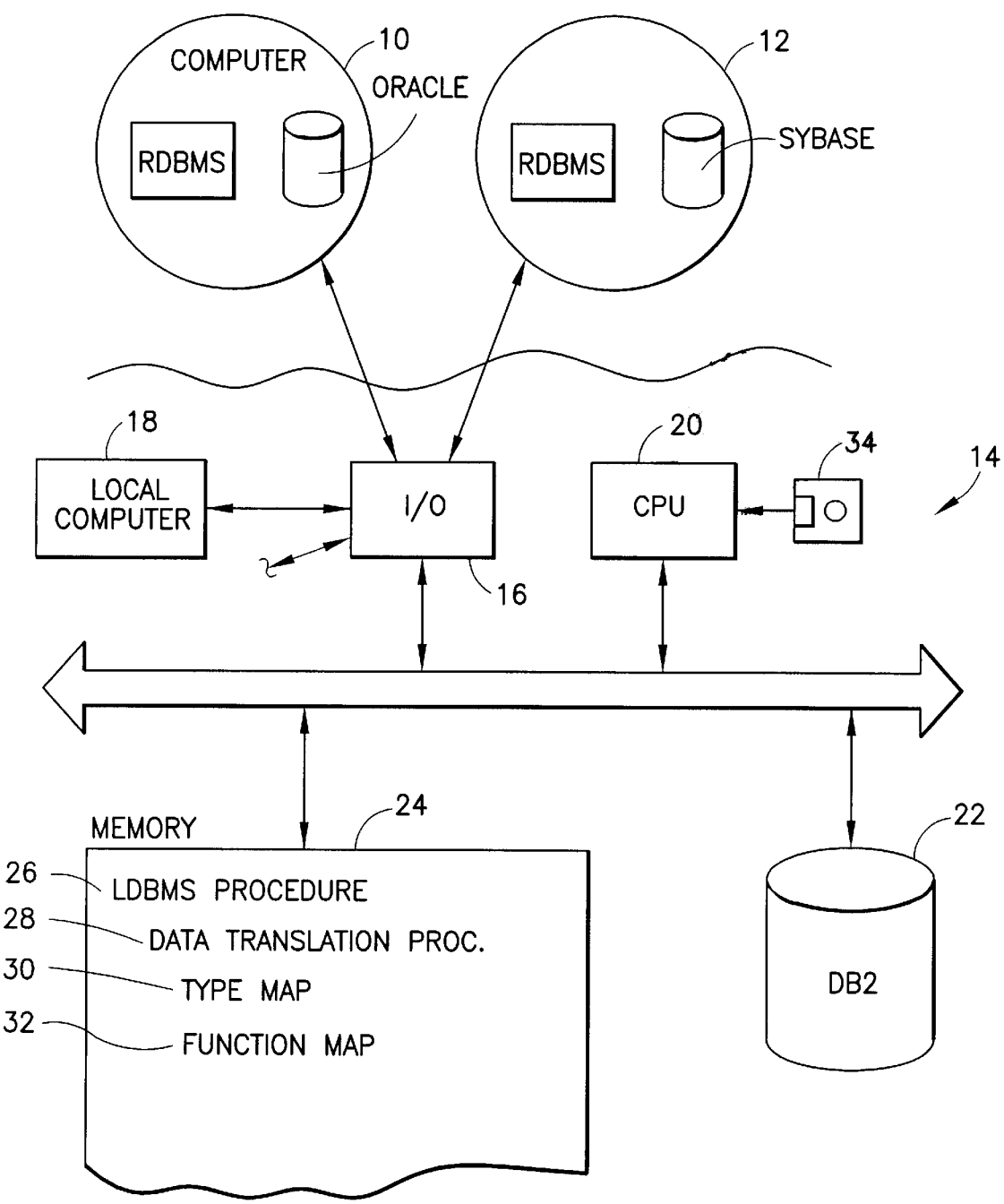
FIG. 1 is a high level block diagram of a heterogeneous database system which provides a transparent application program interface at a local database.

Referring to FIG. 1, a multi-database system comprises, for example, three separate DBMS's, i.e., a computer 10 which includes an Oracle DBMS, a computer 12 which includes a Sybase DBMS, and a computer/server 14 which includes a DB2 DBMS. Since each of computers 10 and 12 include remotely located DBMS's, each will be hereafter referred to as a remote DBMS. By contrast, the DB2 DBMS employed by computer 14 will hereafter be referred to as a local DBMS.

Computer 14 includes an input/output (I/O) function 16 which enables communication with computers 10 and 12 and various local computers 18, etc. As will be hereafter understood, a user at local computer 18 is able to access data from any connected database (whether the data is housed in computers 10, 12 or 14) and at all times it appears to local computer 18 as though the data is coming from and via the local DBMS.

Computer/server 14 includes a central processing unit (CPU) 20, a disk file 22 where the data comprising the DB2 database is stored and a memory 24. Within memory 24 is stored local DBMS procedure 26 which provides overall control of the DB2 database. A subset of local DBMS procedure 26 is a data translation procedure 28 which enables all data presented under control of local DBMS procedure 26 to appear as though it is derived from DB2 database file 22, even though it may be accessed from a remote DBMS. Critical to the functioning of data translation procedure 28 are a type map 30 and a function map 32. Type map 30 provides a mapping between local datatypes that are present in local DBMS procedure 26 and remote datatypes from one or more remote DBMS systems. Function map 32 enables a mapping of local functions to remote functions at each remote DBMS.

While each of local DBMS procedure 26, data translation procedure 28, type map 30 and function map 32 are shown as already loaded into memory 24, it is to be understood that the aforesaid procedures and maps can be loaded into CPU 20 via a memory disk, tape or other storage device 34 in the well known manner. In either case, the operations of CPU 20, in carrying out the functions of the invention, are controlled by the procedures and data stored in either memory 24 or storage device 34.

As is known, various types of databases are accessed, using a data access language such as SQL (structured query language). While the SQL standards define the grammar of the language, they leave open many important considerations, such as details of supported datatypes and functions. For example, SQL, as applied to DB2, includes three date/time datatypes; 1) Date (which contains dates); 2) Time (which contains times); and 3) Timestamp (which contains both date and time). Sybase, on the other hand, only has two date/time datatypes; i.e., Datetime (which allows a certain range of values accompanying both date and time); and Smalldatetime (which also contains both date and time components, but has a considerably smaller range).

As another example of datatype differences, DB2 has four numeric datatypes: Smallint (2 byte number value), Int (4 byte whole number value), Decimal (fixed point decimal number) and Float (floating point value). Oracle has two numeric datatypes, i.e., Number and Float.

Databases also include functional differences. For instance, DB2 has a month function (that returns the month component of a date); a day function (that returns the day component of a date); and a year function (that returns the year component of a date). Oracle has a single function TO_DATE that returns date values, depending upon what parameters or arguments are supplied. As another example of functional differences, DB2 supports a tangent function, whereas other databases do not.

User defined datatypes and functions are mechanisms that enable an augmentation of the capability of a database, by adding a problem domain-specific datatype and/or function. For instance, a banker may require a "Yen" datatype. Similarly, the banker may want to add a Yen-to-Pounds function to convert Yen to Pounds. Such a function and/or datatype present at one database location may not be present at another database location. Accordingly, a simple mapping function will not enable a transparent application program interface from those functions and/or datatypes. Accordingly, as will be understood from the description below, the type and function maps employed by the invention enable (i) a remote datatype to be mapped to multiple local datatypes; (ii) a mapping of different remote datatypes to different local datatypes, without overrides; and (iii) a mapping of different remote datatypes to local datatypes, with overrides.

FIG. 2 illustrates a representation of a Type map 40 which contains information identifying data sources to which the mapping applies: a specification of a local datatype and a specification of a remote datatype. Note that with regards to a source specification, various levels of specificity can be achieved by the contents of one more of columns a–d of Type table 40. For instance, a data source can be identified by a source name; by a source type; by a source version; and/or by a protocol used by the data source. An "N" in Type map 40 indicates that the particular entry is a nullity.

A Local datatype may be specified in Type map 40 by use of a Local schema (name of the owner of the datatype); Local type (the name of the datatype); and a Local precision or a Local scale which, in the example shown in FIG. 2, are not utilized. A Remote datatype can be represented by a Remote schema (dbo stands for database owner in the Sybase database format); a Remote datatype; and additional precision and scale values. The entries in Type map 40 will be considered below in relation to examples.

Consider first a mapping of different datatypes without an override function. Note that Row 1 of Type Map 40 maps a Local datatype of Timestamp (column e) to a Remote datatype of Smalldatetime (column j), but only if the Source type is a Sybase database (column b) and irrespective of the Source name (column a).

A mapping of different datatypes with an override is exemplified by the mapping of Rows 1 and 2. Note that the mapping of Row 2 maps the datatype Date (column f) to Smalldatetime (column j), whereas Row 1 maps the datatype Timestamp (column f) to Smalldatetime (column j). In this case, however, the difference in mapping is controlled by the fact that if the remote source is server 1, the more restrictive source definition of Row 2 overrides the broader mapping of Row 1.

An example of the mapping of a remote single datatype to multiple local datatypes can be seen by referring to Rows 3–5 of Type map 40. In Row 3, the remote datatype is "Number" with an upper precision of 4 and a lower precision of 1. The numeral "4" defines the level of precision (i.e., the total number of digits, i.e., four) of the number datatype and the numeral "1" defines the scale which is the number of decimal digits to the right of the decimal point.

Thus, "Number 4,1" defines a range of values from −9999.9 to +9999.9. Similarly, the Number datatype shown in Row 4 (Number 5,6) defines a number range from −99,999.999999 to +99,999.999999. Note that the mapping of those values, even though they are both number datatypes of the same kind, are, in a first instance, to a Local datatype "Smallint" and in a second instance to Local datatype "Int". Each of datatypes Smallint and Int is a different Local datatype which is subject to different functions within the DB2 database. Similarly, Row 5 of Type map 40 defines an Oracle datatype "Number 31,1" which maps to a Decimal datatype in the DB2 database. Further, the Oracle datatype Number 31,1 must also exhibit an upper scale of 31 and a lower scale of 1 and further, the scale must be greater than or equal to the precision value.

Definitions of precision and scale also vary between data sources. For example, some data sources (such as DB2) require that scale be less than precision yet greater than zero, other data sources do not enforce the same restriction. For example oracle provides a negative scale which allows very large values to be rounded by the database, automatically. For example an Oracle NUMBER 5, −2 allows values from −9,999,900 to +9,999,900, but only in increments of 100 (2 decimal places of rounding). Hence, the database will store values 1,055 and 1,013, both as 1,000. The addition of information relating to scale and precision allows correct mappings across all supported types. For instance, consider a datatype on oracle of NUMBER 31, −5. A DB2 datatype of DECIMAL allows a maximum precision of 32 with a scale greater than zero yet less than the precision. Mapping a NUMBER 31, −5 to a DECIMAL is not valid because 31, −5 give s a large r range of values than can be supported by a DECIMAL. On the other hand, a NUMBER 31,5 can be mapped to a DECIMAL.

While not shown in FIG. 2, Type map 40 can also enable the definition of a user datatype corresponding to a remote datatype. For instance, assume that a Sybase database has a datatype "Yen". Accordingly, a mapping can be added to Type map 40 which maps "Yen" to "integer", a Local datatype. Accordingly, any Yen datatype received would be subject to functions which perform logical or arithmetic operations with respect to integer datatypes.

Referring now to FIG. 3, Function map 50 is illustrated which maps a Local function (e.g. represented by a numeric indicator) to a Remote function, assuming the Remote function is present in an Oracle database (see column b). Functions are generally classified into two types, i.e., scalar and aggregate. A scalar function acts on single values and an aggregate function acts on sets of values. Function map 50 enables a Local function (i.e. a function that a user can specify and then transmit to local DBMS procedure 26 (FIG. 1)) to be mapped to a Remote function or functions.

Not all databases support the same functions and even if a function is identically supported, the syntax, parameters or invocation actions may be different. Accordingly, Function map 50 enables a mapping of functions, even though one function is defined by a prefix notation (e.g. Sine, followed by an argument), whereas others are defined by an interior notation (e.g. argument+argument).

Function map 50 enables a single function to be mapped to plural functions. Often it is not possible to represent a Local function with a single Remote function, but, by combining plural Remote functions, it is possible to achieve a desired result. For example, a DAY function available in DB2 can be represented by TO_Number(TO_CHAR(:1P, 'D')) on an Oracle database.

This is the combination of the TO_CHAR function, which will extract from the date (identified by the parameter:IP) the Day component (as indicated by the 'D', or DAY, parameter), and the To_NUMBER function, which converts a character to a number. Assuming that DAY has a function ID of 100 the mapping table entry for this mapping would resemble:

| | Source Name | Source Type | Source Version | Source Protocol | Local Funct. | Remote Function |
|---|---|---|---|---|---|---|
| Row n | NULL | ORACLE | NULL | NULL | 100 | TO_NUMBER(TO_CHAR(:1P 'D')) |

In addition to supporting mapping a single local function to plural remote functions function map 50 also supports mapping a local function to a remote function with a different function signature. A function signature is the combination of parameters that identify the function uniquely. For example, TO_POUNDS(YEN) and TO_POUNDS (SWISSMARKS) have the same name, TO_POUNDS, but they have different signatures because one takes a parameter of type YEN and the other takes a parameter of type SWISSMARKS. Functions can have the same name on different data sources but different signatures, even if the functions otherwise behave identically. For example, TRANSLATE(:1P, :2P, :3P) on DB2 can be mapped to TRANSLATE(1P, :3P, :2P) on Oracle. The reason is that while the names are the same the signatures are different (the 2nd and 3rd parameters switch positions in Oracle). Assuming that TRANSLATE has a function id of 100, the mapping table entry for this mapping would resemble:

| | Source Name | Source Type | Source Version | Source Protocol | Local Funct. | Remote Funct. |
|---|---|---|---|---|---|---|
| Row n | NULL | ORACLE | NULL | NULL | 100 | TRANSLATE(:1P, :3P, :2P) |

Function map 50 allows further expression of mappings that are not specifically illustrated. For instance, it allows a specification (i) of a function that can take a list of similar arguments, (ii) of functions that accept an additional qualification (such as would be found in some SQL dialects which indicate that a sum of only unique values should be taken); (iii) of functions that take quantified subqueries, scalar subqueries or other forms of expressions as arguments, etc.

Given the potential complexity of the above described mapping schemes, the described maps generally are not sufficient for bilateral mapping. Accordingly, both reverse and forward maps are required that are continuously synchronized to assure consistent and error free mapping.

Hereafter, several examples will be given which illustrate mapping actions of the invention. As will be seen, the mapping allows a change of datatypes to enable a function unique to one datatype to be carried out with respect to the data that has been received. Further, the mapping enables an alteration of functions to be achieved by virtue of a change of datatype. Similarly, a function present at a remote database can be caused to execute by virtue of the identification of the remote function through the function map.

Type Mapping Example:

In this example assume that a multi-national bank has two branches. Branch "L" is in London and Branch "T" is in Tokyo. Each has its own database system. For convenience assume they are both Oracle databases, but they could just as easily each be from different vendors.

Further assume that each branch has exactly one table in its database and that table represents accounts. The table includes three columns: Customer name, account number, and balance. The table was created at branch "L", using this SQL statement:

| CREATE TABLE BRANCHL.ACCOUNTS | (NAME ACCT_NUMBER BALANCE | CHAR (20), INTEGER NUMBER(9,2) |
|---|---|---|

The contents of the BALANCE field are in Pounds (British currency).

Similarly, a corresponding table was created in BRANCH"T", using this SQL statement:

| CREATE TABLE BRANCHT. ACCOUNTS | (NAME ACCT_NUMBER BALANCE | CHAR(20), INTEGER NUMBER(9,2) |
|---|---|---|

The contents of the BALANCE field are in Yen (Japanese currency).

As long as these branches do not need to interchange information, all is well. The fact that the currencies in each table cannot be compared using normal database numeric comparison does not matter yet (5 Yen is not the same amount of money as 5 Pounds, but the only information in the database is the value 5 so the database does not know these values cannot be blindly compared).

Assume that the databases must be interconnected (because the manager in London wants to see all branch bank accounts). Blindly connecting them, by mapping NUMBER (9,2) to the same datatype, would allow the manager to compare amounts incorrectly.

Assume that the software product (Hereafter "SP") integrating the database at branch "L" and branch "T" incorporates the invention. The manager can map the data from these two branches into different datatypes to avoid problems. To do this the manager enters these commands:

```
CREATE DISCRETE TYPE POUNDS AS DECIMAL (9,2) WITH
COMPARISONS

CREATE DISCRETE TYPE YEN AS DECIMAL (9,2) WITH
COMPARISONS

CREATE TYPE MAPPING FROM SERVER LONDON TYPE
NUMBER (9,2) TO TYPE POUNDS

CREATE TYPE MAPPING FROM SERVER TOKYO TYPE NUMBER
(9,2) TO TYPE YEN

CREATE NICKNAME BRANCHL.ACCOUNTS FOR LONDON
BRANCHL.ACCOUNTS

CREATE NICKNAME BRANCHT.ACCOUNTS FOR TOKYO
BRANCHT.ACCOUNTS
```

The first two steps create new datatypes at the SP London server. These new types represent values in Pounds and Yen respectively. The middle two lines define datatype mappings (stored in the Maps discussed above) so that numeric data from Tokyo is treated as Yen and numeric data from London is treated as Pounds. The final two lines define nicknames (i.e., a assigned local names) for the accounts table at each branch.

Following the CREATE NICKNAME statements, the manager is able to submit queries against the tables and not worry about accidently mixing Yen and Pounds because any reference to the data from London will be treated as Pounds and any reference to data from Tokyo will be treated as Yen.

Naturally, it is possible to affect the type mapping after the nickname has been created as well (to allow the manager to change the datatype on a column by column basis). Thus, this SQL would have achieved exactly the same results for the tables in question:

```
CREATE DISCRETE TYPE POUNDS AS DECIMAL (9,2) WITH
COMPARISONS

CREATE DISCRETE TYPE YEN AS DECIMAL (9,2) WITH
COMPARISONS

CREATE NICKNAME BRANCHL.ACCOUNTS FOR LONDON
BRANCHL.ACCOUNTS

CREATE NICKNAME BRANCHT.ACCOUNTS FOR TOKYO
BRANCHT.ACCOUNTS

ALTER NICKNAME BRANCHT.ACCOUNTS SET TYPE = YEN FOR
COLUMN BALANCE

ALTER NICKNAME BRANCHL.ACCOUNTS SET TYPE = POUNDS
FOR COLUMN BALANCE
```

The principle difference is that subsequent nicknames defined in the former case (CREATE TYPE MAPPING) would also have datatype NUMBER 9,2 mapped to Yen or Pounds, whereas in the latter case (ALTER, NICKNAME) the mapping to Yen or Pounds ONLY applies to the specified column of the specified table.

Function Mapping Example:

Now the manager wants to compare amounts to enable queries such as "Show me accounts where the balance is greater than 100,000 Pounds". For the data located at branch "L" this is easy because comparing BALANCE to 100,000 will give the correct results. For the data located at branch "T" this is harder because Yen must first be converted to Pounds.

Three different cases will be considered, one in which the function to convert Yen to Pounds exists at Branch "T" only, one in which the function exists at Branch "L" and one in which the function exists at both Branches "L" and "T". In all cases, the manager doesn't want to know about this level of detail, but just wants to submit a query and receive the correct results, regardless of the location of the function or the data.

Case 1

In Case 1, Branch "T" has a function called CTPV1R2 (which is an initialization for "Convert To Pounds function Version 1 Release 2"). To make it easier to remember, the manager names the function TO_POUNDS by entering

```
CREATE FUNCTION TO_POUNDS(YEN) RETURNS POUNDS
CREATE FUNCTION MAPPING FROM SERVER TOKYO
FUNCTION
CTPV1R2 TO_POUNDS(YEN)
```

The first line indicates that a function exists (i.e., has been added to the local database) called To_Pounds. This function takes a single argument of datatype Yen and Returns a single value of datatype Pounds. The second line defines a function mapping so that SP knows that any query in which Yen need to be converted to Pounds MUST be done at branch "T".

The row in the function mapping table generated as a result of the above CREATE FUNCTION MAPPING statement looks like this:

| Source Name | Source Type | Source Version | Source Protocol | Local Funct. | Remote Function |
|---|---|---|---|---|---|
| Row n TOKYO | NULL | NULL | NULL | 100 | CTPV1R2 (:1P) |

This, of course, assumes that local function To_Pounds (yen) has been assigned the value 100. (Recall that it is important to use a number or full signature, to identify local function). The reason is that To_Pounds(Yen) might be mapped to remote function CTPV1R2 but To_Pounds (SwissMarks) might be mapped to a totally different function).

Once this function mapping is defined, the manager can create a standard relational view over these tables:

```
CREATE VIEW MANAGER ACCCUNTS (NAME, ACCCUNT,
BALANCE)
AS
  SELECT NAME, ACCT_NUMBER, BALANCE FROM
  BRANCH_L.ACCCUNTS
UNION ALL
  SELECT NAME, ACCT_NUMBER, TO_ POUNDS (BALANCE)
  FROM BRANCH_T.ACCOUNTS
```

The manager now can issue any query against this view and get back the data in Pounds, regardless of the location of the data.

Selecting from this view results in this SQL being sent to Tokyo after mapping (among other things):

```
SELECT NAME, ACCT_NUMBER, YTPV1R2(BALANCE) FROM
BRANCH_T.ACCOUNTS
```

Similarly, if the manager specifies only accounts with balances in excess of 100,000 Pounds, the SQL being sent to Tokyo is:

```
SELECT NAME, ACCT_NUMBER,YTPV1R2(BALANCE) FROM
BRANCH_T.ACCOUNTS WHERE YTPV1R2(BALANCE)>100,000
```

Case 2

In case 2, Branch "T" does not have a conversion function. Thus, the local manager needs to create a conversion function. For convenience the manager calls this function TO_POUNDS and places it on the SP server. The function is then identified to SP by entering the command:

```
CREATE FUNCTION TO_POUNDS (YEN) RETURNS POUNDS
SOURCE/MY CODE/TO_POUNDS
```

This statement not only tells SP that the function exists and takes a single argument of type Yen and returns a single value of type POUNDS, but it also tell SP the function exists locally (because the SOURCE clause points to code to execute the function locally). Any use of the TO_PoundS function automatically occurs at the SP server. The manager can, similarly, create a view as was done above. The SQL, in fact, is identical, as is the result. The principle difference is that at run-time (when the query is executed) rather than push the TO_POUNDS function to Tokyo (as function CTPV1R2), it is evaluated locally.

This SQL is sent to Tokyo:

```
SELECT NAME,ACCT_NUMBER,BALANCE FROM
BRANCH_T.ACCOUNTS
```

The conversion of the balance from Yen to Pounds occurs locally.

Selecting from the view with the additional predication (selection criteria) results in

```
SELECT NAME, ACCT_NUMBER, BALANCE FROM
BRANCH_T.ACCOUNTS
``` being sent to Tokyo. The reason is that Tokyo does not know how to convert Yen to Pounds and thus cannot determine if the account meets the criteria of having a balance greater than 100,000 Pounds.

Case 3

In case 3, it is assumed that the function exists both locally and remotely (the SOURCE option was specified on the create function statement, indicating that the function exists locally AND the function mapping has been performed telling the function also exists remotely). In this case, SP is free to choose where to perform the conversion from Yen to Pounds. Depending the query, it can evaluate the function locally or remotely to minimize processing costs.

The above examples are simple. In a real world example, there would be many, many branches and functions to convert various types of currencies. Some of the branches (such as a Zurich branch) would have many different kinds of currencies represented, or the database involved may be from different vendors (Sybase in Zurich, DB2 in New York, and Oracle in Tokyo and London). Further, while simple functions have been considered, a remote function can be a complex series of functions. For example, if a remote function of Yen_to_Pounds exists and another function of Pounds_to_Dollars exists, a local function of Yen_to_ Dollars can be defined which is a combination of the remote functions. In other words, the local function of Yen_to_ Dollars would be mapped to the following combination of remote functions: Pounds_to_Dollars(Yen_to_Pounds (Yen value)). Also, the invention allows a mapping between remote and local functions which employ different signatures.

It should be understood that the foregoing description is only illustrative of the invention. Various alternatives and modifications can be devised by those skilled in the art without departing from the invention. For instance, while the above discussion has concerned functions, such as a conversion of Yen to Pounds, the invention is equally applicable to enforcement of constraints (e.g. an interest rate for a savings account cannot become negative) . Accordingly, the present invention is intended to embrace all such alternatives, modifications and variances which fall within the scope of the appended claims.

We claim:

1. A system for providing a transparent interface at a local processor to both a local data source and at least one remote data source, said remote data source including a remote data source control procedure which includes remote datatypes and remote data functions, said system comprising:

memory means for storing a local data source control
    procedure including
    (i) local datatypes,
    (ii) local functions,
    (ii) table means for storing a mapping between local
      datatypes and remote datatypes, and local functions
      and remote functions, said mapping between at least
      one local datatype and at least one remote datatype
      indicating that said at least one remote datatype is to
      be transformed into a local datatype that is different
      from the remote datatype; and
  processor means for utilizing said table means to convert
    a received instance of said at least one remote datatype
    to a local datatype and subjecting data comprising said instance of said at least one remote datatype to a local function or constraint that is executable or enforceable with respect to said local datatype but not for said remote datatype.

2. The system as recited in claim 1, wherein said processor means uses said table means to convert said instance of said at least one remote datatype to one of a set of plural local datatypes, depending upon a characteristic of data comprising said at least one remote datatype.

3. The system as recited in claim 1, wherein said function comprises a further mapping of said instance of said at least one remote datatype to still other local datatypes.

4. The system as recited in claim 1, wherein said function comprises a logical operation that is performed on said data comprising said at least one remote datatype.

5. The system as recited in claim 1, wherein said function comprises a constraint which applies to said data comprising said at least one remote datatype.

6. A system for providing a transparent interface at a local processor to both a local data source and at least one remote data source, said remote data source including a remote data source control procedure which includes remote datatypes and remote data functions, said system comprising:
   memory means for storing a local data source control procedure including
   (i) local datatypes,
   (ii) local functions,
   (ii) table means for storing a mapping between local datatypes and remote datatypes, and local functions and remote functions; and
   local processor means for dispatching, to a remote processor controlling said remote data source, a request for an instance of at least one remote datatype and further specifying performance of a remote function at said remote processor with respect to data comprising said at least one remote datatype, said remote function determined from said table means as a result of a specification of a local function that is not readily performable by said local processor.

7. The system as recited in claim 6, wherein said remote function comprises a plurality of logical operations.

8. The system as recited in claim 6, wherein said remote function is denoted by a signature that is different from said local function.

9. A memory media for controlling a local processor, including local memory means, to provide a transparent interface to both a local data source and at least one remote data source, said remote data source including a remote data source control procedure which includes (i) remote datatypes and (ii) remote data functions, said local memory means storing a local data source control procedure which includes (i) local datatypes, (ii) local functions, and (ii) table means for storing a mapping between local datatypes and remote datatypes, and local functions and remote functions, said mapping between at least one local datatype and at least one remote datatype indicating that said at least one remote datatype is to be transformed into a local datatype that is different from a remote datatype, said memory media comprising:
   a) means for controlling said local processor to dispatch, to a processor controlling said remote data source, a request for an instance of said at least one remote datatype;
   b) means for controlling said local processor to utilize said table means to convert a received instance of said at least one remote datatype to a local datatype; and
   c) means for controlling said local processor to subject data comprising said instance of said at least one remote datatype to a local function or constraint that is executable or enforceable with respect to said local datatype but not for said remote datatype.

10. The memory media as recited in claim 9, wherein said means b) causes said local processor to use said table means to convert said instance of said at least one remote datatype to one of a set of plural local datatypes, depending upon a characteristic of data comprising said at least one remote datatype.

11. The memory media as recited in claim 9, wherein said executable local function comprises a further mapping of said instance of said at least one remote datatype to still other local datatypes.

12. The memory media as recited in claim 9, wherein said executable local function comprises a logical operation that is performed on said data comprising said at least one remote datatype.

13. The memory media as recited in claim 9, wherein said executable local function comprises a constraint which applies to said data comprising said at least one remote datatype.

14. A memory media for controlling a local processor, including local memory means, to provide a transparent interface to both a local data source and at least one remote data source, said remote data source including a remote data source control procedure which includes (i) remote datatypes and (ii) remote data functions, said local memory means storing a local data source control procedure which includes (i) local datatypes, (ii) local functions, and (ii) table means for storing a mapping between local datatypes and remote datatypes, and local functions and remote functions, said memory media comprising:
   a) means for controlling said local processor to determine a remote function from said table means in response to a specification of a local function that is not readily performable by said local processor; and
   b) means for controlling said local processor to dispatch to a remote processor controlling said remote data source, (i) a request for an instance of at least one remote datatype, and (ii) a request for performance of said remote function at said remote processor with respect to data comprising said at least one remote datatype.

15. The memory media as recited in claim 14, wherein said remote function requested to be performed comprises a plurality of logical operations that are performed on said data comprising said at least one remote datatype.

16. The system as recited in claim 14, wherein said remote function requested to be performed is denoted by a signature that is different from said local function.

17. A method for controlling a local processor, including local memory means, to provide a transparent interface to both a local data source and at least one remote data source, said remote data source including a remote data source control procedure which includes (i) remote datatypes and (ii) remote data functions, said local memory means storing a local data source control procedure which includes (i) local datatypes, (ii) local functions, and (ii) table means for storing a mapping between local datatypes and remote datatypes, and local functions and remote functions, said mapping between at least one local datatype and at least one remote datatype indicating that said at least one remote datatype is to be transformed into a local datatype that is different from a remote datatype, said method comprising the steps of:
   a) controlling said local processor to dispatch, to a processor controlling said remote data source, a request for an instance of said at least one remote datatype;

b) controlling said local processor to utilize said table means to convert a received instance of said at least one remote datatype to a local datatype; and c) subjecting data comprising said instance of said at least one remote datatype to a local function or constraint that is executable or enforceable with respect to said local datatype but not for said remote datatype.

18. The method as recited in claim 17, wherein said step b) causes said local processor to use said table means to convert said instance of said at least one remote datatype to one of a set of plural local datatypes, depending upon a characteristic of data comprising said at least one remote datatype.

19. The method as recited in claim 17, wherein said local function of step c) comprises a further mapping of said instance of said at least one remote datatype to still other local datatypes.

20. The method as recited in claim 17, wherein said local function of step c) comprises a logical operation that is performed on said data comprising said at least one remote datatype.

21. The method as recited in claim 17, wherein said local function of step c) comprises a constraint which applies to said data comprising said at least one remote datatype.

22. A method for controlling a local processor, including local memory means, to provide a transparent interface to both a local data source and at least one remote data source, said remote data source including a remote data source control procedure which includes (i) remote datatypes and (ii) remote data functions, said local memory means storing a local data source control procedure which includes (i) local datatypes, (ii) local functions, and (ii) table means for storing a mapping between local datatypes and remote datatypes, and local functions and remote functions, said method comprising the steps of:

a) controlling said local processor to determine a remote function from said table means in response to a specification of a local function that is not readily performable by said local processor; and b) dispatching from said local processor to a remote processor controlling said remote data source, (i) a request for an instance of at least one remote datatype, and (ii) a request for performance of said remote function at said remote processor with respect to data comprising said at least one remote datatype.

23. The method as recited in claim 22, wherein said remote function of step b(ii) comprises a plurality of logical operations that are performed on said data comprising said at least one remote datatype.

24. The method as recited in claim 22, wherein said remote function of step b(ii) is denoted by a signature that is different from said local function.

* * * * *